Figure 1:
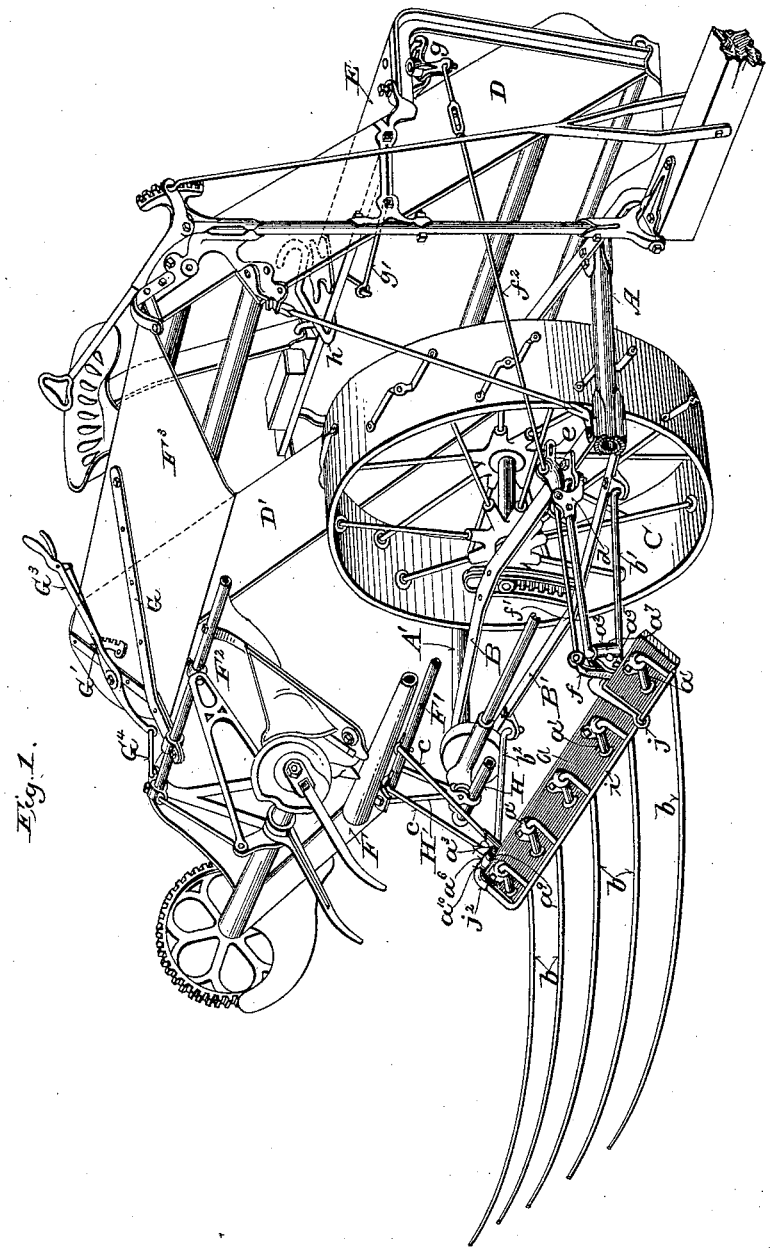

(No Model.) 5 Sheets—Sheet 1.

J. W. LATIMER.
SHEAF CARRIER.

No. 452,380. Patented May 19, 1891.

Witnesses:
Benj. C. Adams,
Jas. D. Walker

Inventor:
John Warden Latimer (No Model.) 5 Sheets—Sheet 4.
J. W. LATIMER.
SHEAF CARRIER.
No. 452,380. Patented May 19, 1891.
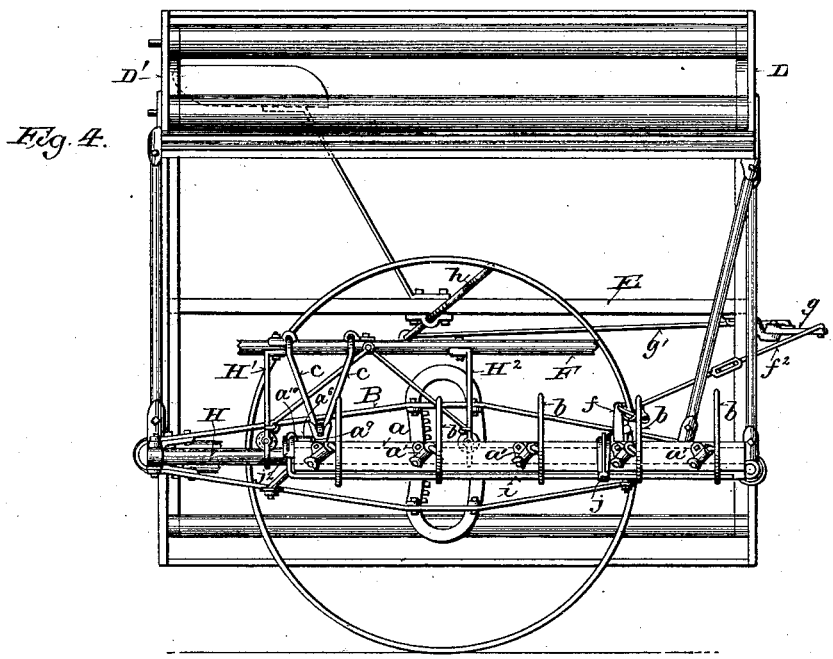
Fig. 4.
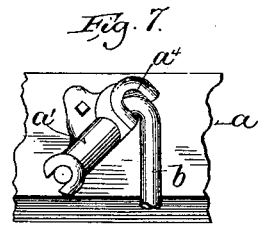
Fig. 7.
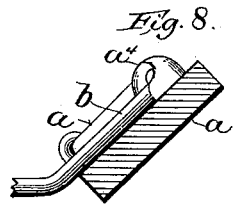
Fig. 8.
Fig. 6.
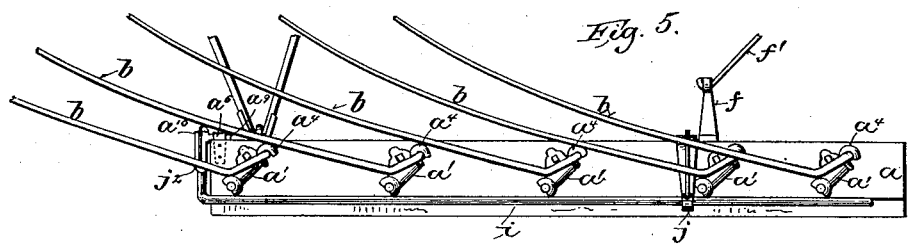
Fig. 5.
Witnesses:
Benj. C. Adams.
Jas. D. Walker
Inventor:
John Warden Latimer (No Model.)  
5 Sheets—Sheet 5.
J. W. LATIMER.
SHEAF CARRIER.
No. 452,380. Patented May 19, 1891.
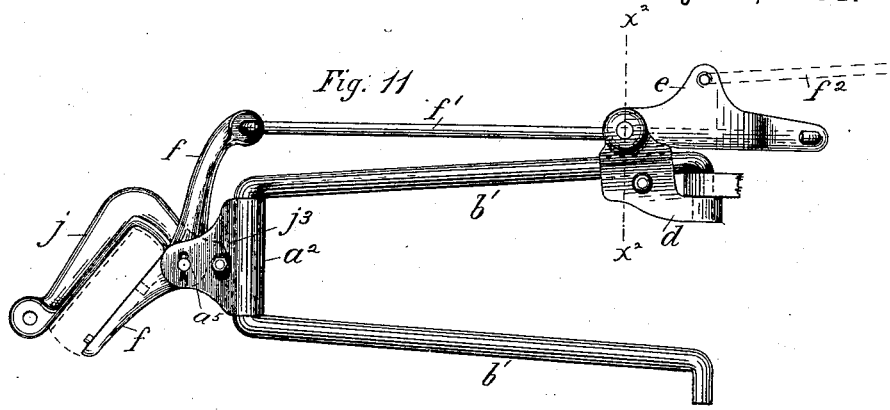
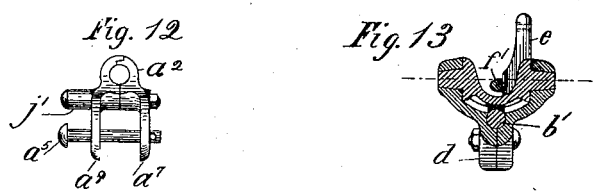
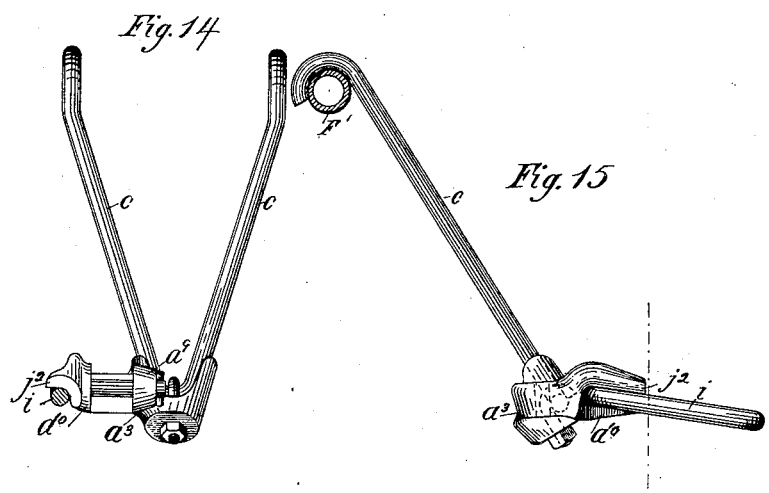
Witnesses,
Benj. C. Adams.
Jas. D. Walker
Inventor,
John Warden Latimer.

UNITED STATES PATENT OFFICE.

JOHN WARDEN LATIMER, OF MILWAUKEE, WISCONSIN, ASSIGNOR TO THE MILWAUKEE HARVESTER COMPANY, OF SAME PLACE.

SHEAF-CARRIER.

SPECIFICATION forming part of Letters Patent No. 452,380, dated May 19, 1891.

Application filed June 13, 1890. Serial No. 355,399. (No model.)

*To all whom it may concern:*

Be it known that I, JOHN WARDEN LATIMER, a citizen of the United States, residing at Milwaukee, in the county of Milwaukee and State of Wisconsin, have invented certain new and useful Improvements in Sheaf-Carriers for Self-Binding Harvesters, of which the following is a specification.

My invention relates to that class of sheaf-carriers which are attached to self-binding harvesters and which receive and sustain the bound sheaves as they are delivered from the binder until a sufficient number has been collected, when they are unloaded upon the ground convenient for shocking.

The main object of my invention is to produce a sheaf-carrier which will be light, simple in its construction, and capable of being folded for the purpose of transportation and passing through narrow openings in traveling from place to place. I attain this object, first, by locating the carrier-fingers at suitable intervals apart, the body of said fingers projecting in lines approximately at right angles to the advance of the machine and pivoted independently of each other to an oscillatory supporting-bar hinged to the machine approximately in line with its advance, the pivotal connections of said fingers with the oscillatory bar being oblique thereto, so that when the outer ends of the fingers are dropped into contact with the ground the forward movement of the machine will cause them to swing rearwardly to discharge their load, and so that when the supporting-bar is returned to its normal position the fingers, by reason of the inclination of their pivot-journals, will automatically gravitate into receiving position; second, by providing a locking-rod by which the fingers are held in place when they are returned to their receiving positions together with suitable mechanism for releasing the supporting-bar to discharge the load and for returning it to and locking it in its normal position; third, by rigidly connecting the carrier with the binder-frame, so as to cause it be moved therewith in the adjustment of the binder forward and back to accommodate grain of different lengths and by interposing between the carrier and harvester frame connections which support said carrier in a proper position relative thereto and at the same time permit of its adjustment together with the binder; fourth, by so constructing the fingers and their pivotal connections with the oscillatory supporting-bar that the former may be folded upwardly and rearwardly toward the machine for the purpose of passing through narrow passages in traveling from place to place or for the purpose of transportation.

Figure 2:
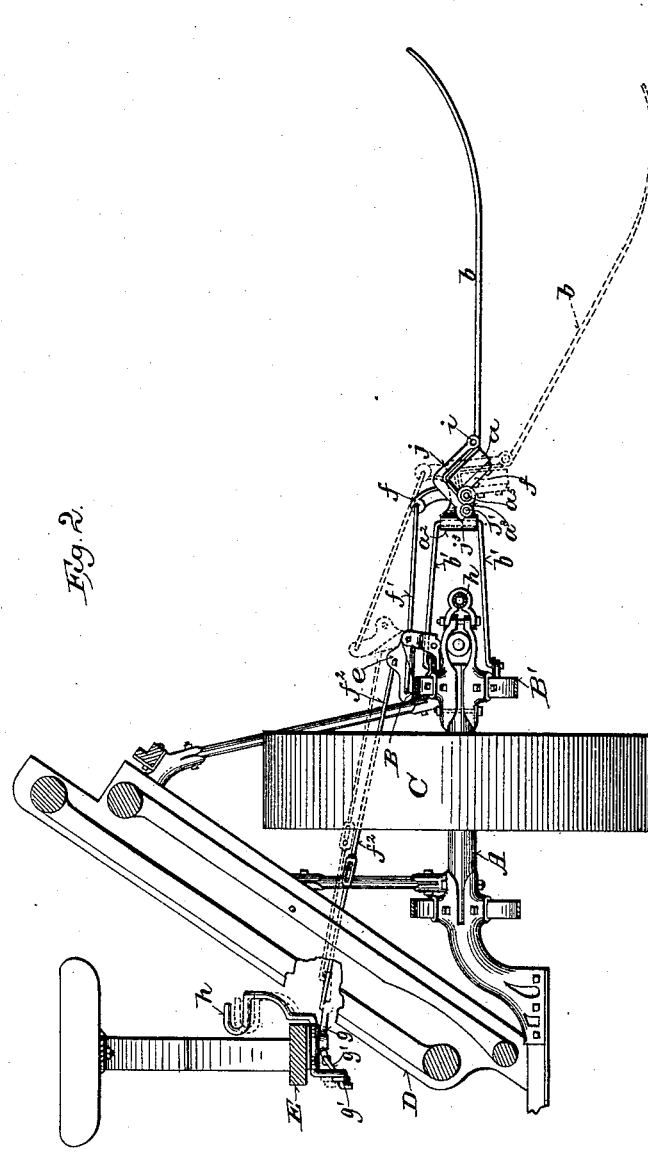
Figure 3:
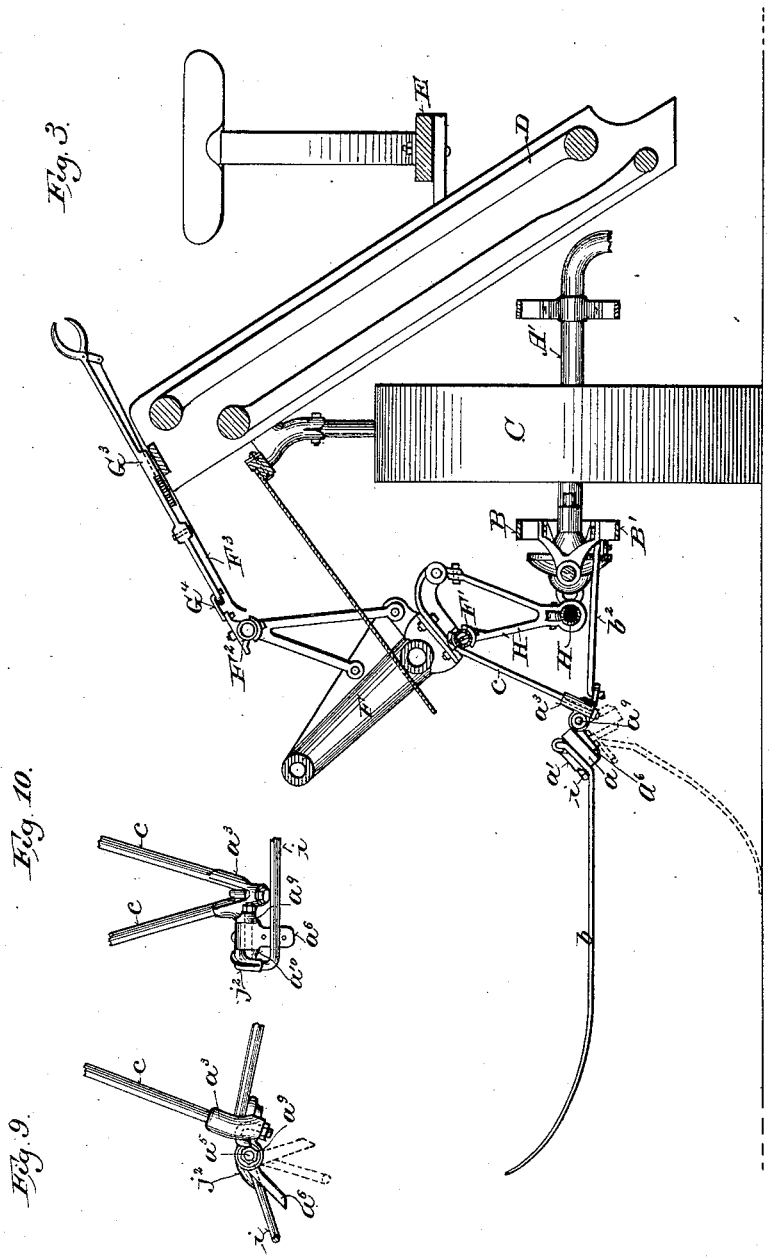

In the drawings, Figure 1 is a perspective view of such a portion of a harvester and binder with a carrier embodying my improvements applied thereto as is necessary to a full understanding of my invention. Fig. 2 is an elevation, partially in section and viewed from the rear, showing the carrier in a receiving position, the manner of supporting and connecting the forward end of the carrier to the harvester, the locking mechanism for locking the carrier in a receiving position, and the foot connection at the seat-support. Fig. 3 is a side elevation, partially in section and viewed from the front, showing how the rear end of the carrier is connected with the binder, the position of the binder when attached to the harvester, the binder-deck, the binder-shifting lever, and its connection with the binder. Fig. 4 is an end elevation with carrier attached thereto and viewed from the delivery end of the machine. In this figure all of the binder has been broken away, except the lower pipe-sill and the binder-supports. Fig. 5 shows the carrier with fingers folded for transportation and passing through narrow openings. Figs. 6, 7, 8, 9, and 10 are enlarged detailed views of portions of the carrier. Fig. 11 is an enlarged elevation in detail of the front support of the carrier and showing the relative position of the levers when the carrier is in a receiving position. Fig. 12 is a plan view of casting $a^2$, and Fig. 13 is a section of Fig. 11 on line $x^2 x^2$. Figs. 14 and 15 are respectively enlarged front and end elevations of the rear support of the carrier.

In the drawings, Figs. 1, 2, 3, and 4, the carrier is shown with full lines in a receiving position. In Fig. 2 the carrier is represented by dotted lines with the fingers in contact with the ground, and in Fig. 3 the dotted lines represent the carrier in a discharging position.

A represents the front and A' the rear sill of the harvester-frame; B and B', the upper and lower members of the outside truss of the wheel-frame.

C is the main drive-wheel.

D and D' are the front and rear elevator-frames, and E is the seat-support.

F represents the main frame of the binder, and F' the lower pipe-sill. The binder is supported from below by supports H' and H², provided with roulettes at their lower ends, which travel upon the outer girt H of the harvester-frame when the binder is moved either forward or back upon the harvester. The binder is further supported and secured to the harvester by hanger-straps G and G', bolted to the large grain-deflector F³, which in turn is secured to the upper ends of the front and rear elevator-frames D and D'. Hanger-straps G and G' unite at their lower extremities and form a clasp, which forms a bearing for pipe-sill F² as the binder is moved in an endwise direction.

The particular harvester and binder shown in the drawings, which form a part of this application, are selected only as an exponent of the various styles to which my invention is applicable.

In the carrier, $a$ represents the support-bar. It is located below the delivery-point of the binder and in a line parallel with the advance of the machine. In practice I would place the upper surface of the support-bar $a$, to which the fingers are journaled, at an angle of from forty to forty-five degrees with the horizontal when the carrier is in a receiving position.

In the drawings, the support-bar $a$ is represented as being of wood; but it may be constructed of any suitable material. At suitable intervals upon the support-bar $a$ are bolted the journal-bearings $a'$ for the fingers $b$. These journal-bearings $a'$ cross the support-bar $a$ from the upper to the lower edge in an oblique direction inclined to the rear. The fingers $b$ are formed by first bending a portion of the inner end of said finger upward. This upward bend is then turned back upon itself, forming the journal of the finger which is at an angle of from thirty to forty degrees with the body of the finger and in the same oblique plane with the first bend, Figs. 6, 7, and 8. The outer ends of the fingers are curved upward to prevent the sheaves from sliding off of the carrier while the load is accumulating. The support-bar $a$ is hinged to castings $a^2$ and $a^3$, which in turn are held in their respective positions by means of the swinging struts $b'$ and $b^2$ and by the V-shaped support-brace $c$, all of which will be hereinafter explained. Casting $a^2$ is provided with two perforated ears $a^7$ and $a^8$, between which is pivoted by means of bolt $a^5$ the lever $f$. Lever $f$ extends downward from its pivot and is bolted to the lower side of the support-bar $a$, thus forming with casting $a^2$ the front hinge upon which the support-bar $a$ turns. Casting $a^3$ is likewise provided with perforated ears $a^9$ and $a^{10}$, and between these two ears is pivoted casting $a^6$, which also extends downward and is bolted to the lower side of support-bar $a$ and constitutes its rear hinge.

The swinging strut and support $b'$ is constructed with upper and lower arms uniting in a vertical journal which has its bearing in casting $a^2$. The inner ends of swinging strut $b'$ are pivoted vertically to the upper and lower members B and B' of the outside truss near its front end. Arm $b^2$ is pivoted at one end to the lower member B' of the outside truss near its rear end and at its opposite end to casting $a^3$ in the same manner. The V-shaped support-brace $c$ is secured at its upper ends to pipe-sill F' of the binder-frame and its lower end is bolted by a hook-bolt to casting $a^3$, Figs. 9 and 10.

By referring to Fig. 1 of the drawings it will be seen that if the binder should be moved forward or back by means of lever G³ and its connecting-link G⁴ the V-shaped support-brace $c$ will cause the carrier to move with it, and the swinging struts $b'$ and $b^2$ will support and retain it in the proper position relative to the harvester-frame.

$e$ is the locking-lever for locking the carrier in a receiving position. It is journaled at one end to casting $d$, which is clasp-bolted to the upper arm of strut $b'$. $f$ is the lever by which the carrier is controlled and is connected to locking-lever $e$ by means of connecting-rod $f'$. Locking-lever $e$ is so constructed that it will cause connecting-rod $f'$ to pass below its pivot, and thus lock the carrier in a receiving position. The connecting-points of the lever $e$ and lever $f$, with connecting-rod $f'$, are located directly over the pivot-points of swinging strut $b'$ when the carrier is in a receiving position. This prevents the rising and falling of the outer ends of the fingers when the carrier is moving with the binder backward or forward.

$f^2$ is a connecting-rod connecting the locking-lever $e$ with bell-crank $g$ at the forward end of the seat-support E.

$g'$ is the connecting-rod, connecting bell-crank $g$ with foot-lever $h$, pivoted to the seat-support E within reach of the driver's foot.

$i$ is the locking-rod by which the fingers $b$ are prevented from turning upon their pivots after the support-bar $a$ has been brought to a receiving position. It rests upon the fingers $b$, parallel with the support-bar $a$, and at one end is bent upward at right angles and backward parallel with itself. This backward bend passes through the ear $a^{10}$, casting $a^6$, and ear $a^9$, and constitutes the axis for the rear hinge of support-bar $a$. The forward end of rod $i$ is held in position by lever $j$, pivoted to casting $a^2$, and is arrested in its upward movement, when the fingers $b$ are brought into receiving position, by an extension $j^3$ of said lever $j$, which engages a lug $j'$ on casting $a^2$. In like manner the rearward end of the locking-rod $i$ is prevented from rising above its position with fingers $b$, when fingers $b$ are in a receiving position, by a lug $j^2$ on ear $a^{10}$, which engages the upward bend of said rod. (See Figs. 9 and 10.)

By the means thus described locking-rod $i$ is permitted to follow the fingers $b$ in their downward movement; but when the support-bar $a$ is brought to a receiving position the fingers $b$ are rigidly held between said bar $a$ and the locking-rod $i$ and cannot turn upon their pivots except the support-bar $a$ be again released.

The operation of my device is as follows: When a sufficient number of sheaves have been collected upon the fingers, the operator with his foot raises the foot-lever, which unlocks the carrier by raising the locking-lever $e$ and permits the support-bar $a$ to turn upon its hinges and allow the fingers to fall to the ground, as shown in Fig. 2. When the fingers are in this position, the forward movement of the machine will cause them to yield rearward, and they in turn will cause the support-bar $a$ to continue its revolution, thus constantly changing the position of the finger-pivots and permit the fingers to yield sufficiently to the rear to discharge their load. To retract the carrier, the lever $h$ is pressed forward, which returns and locks in its normal position the support-bar $a$. The fingers meanwhile return to a receiving position by force of gravity. To fold the carrier-fingers for transporting the machine and passing through narrow passage-ways, the locking-rod $i$ is withdrawn from its bearings in hinge-casting $a^3$ and lever $j$. The fingers are then folded back against stops $a^4$ on journal-caps $a'$, and the locking-rod $i$ is then replaced, as shown in Fig. 5.

It will be understood that I do not intend to limit myself to the precise construction herein described, for it is evident that various changes can be made without departing from the scope of my invention. For instance, the strut $b'$ for supporting the forward end of the carrier may be dispensed with and a similar means to that employed for supporting the rear end of the carrier used in its stead.

Having thus described my invention, what I claim, and desire to secure by Letters Patent, is—

1. In a self-binding harvester, the combination, with the binder, of an oscillatory supporting-bar hinged to the machine approximately in line with its advance and below the delivery thereof, a series of supporting-fingers separately pivoted to said supporting-bar, with journals at their inner ends inclining upward and forward and lying in a plane parallel with the face of the supporting-bar and oblique to the length thereof, substantially as set forth.

2. In a self-binding harvester, the combination, with the binder, of an oscillatory supporting-bar hinged to the machine approximately in line with its advance and below the delivery thereof, a series of fingers formed at their inner ends with reverse bends, by which they are separately pivoted to said supporting-bar, and suitable means for turning said supporting-bar on its hinges and locking it in place, substantially as set forth.

3. In a self-binding harvester, the combination, with the binder, of an oscillatory supporting-bar hinged to the machine approximately in line with its advance and below the delivery thereof, a series of fingers pivoted to said supporting-bar at their inner ends in lines oblique thereto, so as to swing rearwardly toward the machine when they are lowered into contact with the ground and to automatically gravitate into receiving position when said supporting-bar is raised into normal position, and a locking-bar arranged to bear against said fingers near their inner ends and to hold the same in place when they are returned into receiving position, substantially as set forth.

4. In a self-binding harvester, the combination, with the binder, of an oscillatory supporting-bar hinged to the machine approximately in line with its advance and below the delivery thereof, a series of fingers projecting substantially at right angles therefrom, said fingers formed with upward bends at their inner ends, turned back upon themselves at an angle thereto and in the same oblique plane and journaled in bearings set at suitable intervals, trending downward oblique to the rear, the carrier as a whole rigidly secured to the binder and connected with the harvester-frame with swinging parallel connections adapted to move with the binder and receive the sheaves therefrom, sustaining them until a sufficient number has been gathered, when they are unloaded upon the ground, substantially as set forth.

5. In a self-binding harvester, the combination, with the binder and harvester frame, of a sheaf-carrier rigidly connected with said binder, so as to partake of its forward and backward movement in the adjustment of said binder for grain of different lengths, and supports interposed between said carrier and the harvester-frame, whereby said carrier is held at the proper distance from said frame, the aforesaid adjustment is permitted, and the connections with the binder are relieved of strain, substantially as set forth.

6. In a self-binding harvester, the combination, with the harvester and binder frame, of a sheaf-carrier secured thereto below and in a line with the delivery of the binder, parallel arms set at a suitable distance apart and connecting said carrier to the harvester-frame with substantially vertical pivots, and a rigid connection connecting the carrier with the binder-frame, so as to partake of its forward and backward movement in the adjustment of said binder for different lengths of grain, substantially as set forth.

7. In a self-binding harvester, the combination, with the binder, of an oscillatory supporting-bar hinged to the machine approximately in line with its advance and below the delivery thereof, a series of fingers projecting substantially at right angles therefrom, said fingers journaled in bearings trending downward oblique and to the rear and capable of being folded rearward and upward for transportation when the carrier is locked in a receiving position, a controlling-lever secured to said support-bar, a locking-lever mounted upon one of the arms connecting the carrier with the harvester-frame, a foot-lever pivoted to the seat-support, and means for connecting said foot-lever with said locking-lever and said locking-lever with the controlling-lever secured to the support-bar, substantially as set forth.

JOHN WARDEN LATIMER.

Witnesses:
FRED G. BECKER,
HENRY F. CRANDALL.